United States Patent [19]

Baer

[11] 4,205,142
[45] May 27, 1980

[54] FLAME RETARDANT RESIN COMPOSITIONS

[75] Inventor: Massimo Baer, Longmeadow, Mass.
[73] Assignee: Monsanto Company, St. Louis, Mo.
[21] Appl. No.: 847,959
[22] Filed: Nov. 2, 1977
[51] Int. Cl.² .............................................. C08L 67/06
[52] U.S. Cl. ................................ 525/166; 260/40 R; 260/45.75 B; 260/45.95 G; 525/175; 525/177
[58] Field of Search ........................................ 260/873
[56] References Cited

U.S. PATENT DOCUMENTS

| | | | |
|---|---|---|---|
| 3,660,321 | 5/1972 | Praetzel | 260/2.5 FP |
| 3,758,640 | 9/1973 | Thorpe | 260/873 |
| 3,793,400 | 2/1974 | Curtis | 260/873 |
| 3,852,401 | 12/1974 | Suzuki | 264/182 |
| 3,904,707 | 9/1975 | Gebhart | 260/873 |
| 3,954,903 | 5/1976 | Kudo | 260/873 |
| 4,010,139 | 3/1977 | Bertelli | 260/873 |
| 4,016,221 | 4/1977 | Kudo | 260/873 |
| 4,111,892 | 9/1978 | Kamada | 260/873 |
| 4,131,594 | 12/1978 | Nakamura | 260/873 |

FOREIGN PATENT DOCUMENTS

| | | | |
|---|---|---|---|
| 2448596 | 4/1975 | Fed. Rep. of Germany | 260/873 |
| 2523010 | 11/1975 | Fed. Rep. of Germany | 260/873 |
| 49-97081 | 9/1974 | Japan | 260/873 |
| 1208585 | 10/1970 | United Kingdom | 260/873 |

*Primary Examiner*—Paul Lieberman
*Attorney, Agent, or Firm*—R. Bruce Blance; William J. Farrington; Edward P. Grattan

[57] ABSTRACT

Flame retardant resin compositions are disclosed, comprising a thermoplastic condensation polymer selected from the group consisting of polyesters, polycarbonates and polyamides, a halogenated flame-retardant, and a rubber-occluded flame retardant synergist. The compositions possess superior stability in melt processing and improved flame retardancy and impact strength.

17 Claims, No Drawings

FLAME RETARDANT RESIN COMPOSITIONS

This invention relates to compositions moldable into flame retardant articles comprising a condensation polymer, a halogenated additive, and a rubber-occluded flame retardant synergist and to the molded articles obtained therefrom.

The production of molding grade resins from condensation polymers such as polyesters, polycarbonates and polyamides, which are flame retardant and possess good mechanical properties is of considerable commercial importance.

Halogenated materials are commonly used to impart flame retardance to polyesters and polyamides. Their use in such condensation polymers has been hampered by the fact that HCl or HBr produced during processing by decomposition of the flame retardant additive leads to hydrolsis and degradation of condensation polymers. This hydrolytic degradation is particularly severe at the high processing temperatures needed with the stiff-flowing aromatic polyesters and polycarbonates.

To greatly reduce the amount of halogenated additives needed for flame retardance, antimony oxide or other synergists are normally used. However, these synergists, while very effective in imparting flame retardance, greatly increase the hydrolytic and degradation process and also reduce blend toughness by behaving as stress concentrators.

SUMMARY OF THE INVENTION

It has been found possible to greatly retard and minimize the above degradative process in condensation polymers by discouraging premature physical and chemical contact of the flame retardant synergist with the flame retardant under normal processing and molding conditions, while still allowing such needed interaction to occur at flame temperatures. This is accomplished by isolating the halogenated additive from the synergist by either (1) encapsulating or imbedding the synergist in rubber particles or (2) covering the surface of synergist particles with a stable rubber film or layer.

One aspect of the invention is therefore directed to flame retardant resin compositions comprising A. a condensation polymer selected from the group consisting of thermoplastic polyesters, polycarbonates and polyamides;

B. an effective amount of a halogenated flame retardant additive; and

C. an effective amount of a flame retardant synergist of average particle size less than about 2 microns, wherein the particles of the synergist are substantially occluded with a non-blocking rubber.

Another aspect of the invention is directed to articles molded from such resin compositions and a third aspect of the invention is directed to the process of preparing the resin compositions comprising A. dispersing a flame retardant synergist of average particle size less than about 2 microns in a latex of a non-blocking rubber of average particle size in the range of about 0.05 to about 2 microns, B. coagulating the latex to form a coagulum wherein the rubber particles substantially occlude the particles of flame retardant synergist, C. recovering and drying the coagulum, and D. melt blending and dispersing the coagulum in a thermoplastic condensation polymer selected from the group consisting of polyesters, polycarbonates and polyamides containing an effective amount of flame retardant, to provide a dispersion of substantially occluded flame retardant synergist in a synergistically effective amount in the condensation polymer.

THE PREFERRED EMBODIMENT

The thermoplastic condensation polymers suitable for the preparation of the resin compositions of the present invention are selected from the group consisting of polyesters, polycarbonates and polyamides.

Suitable polyesters are the condensation products obtained by reaction of glycols and diphenols with dicarboxylic acids. Typical glycols are the alkylene glycols and the alkyleneoxy glycols in which the alkylene group may contain from 2 to 8 carbon atoms, such as ethylene glycol, tetramethylene glycol, hexamethylene glycol, cis- or trans- 1,4-dimethylolcyclohexane and diethylene glycol. Typical diphenols (preferably condensed in the form of their diacetates or diesters of other volatile acids prior to reaction with the dicarboxylic acid) include hydroquinone, resorcinol, bis(4-hydroxyphenyl)methane, 1,1-bis(4-hydroxyphenyl)ethane, 1,2-bis(4-hydroxyphenyl)ethane, 2,2-bis(4-hydroxyphenyl)propane, bis (4-hydroxyphenyl)sulfide, bis(4-hydroxyphenyl)sulfone, bis(4-hydroxyphenyl)ether, as well as the various diphenols such as 4,4'-diphenol and the dihydroxynaphthalenes such as 2,5-dihydroxynaphthalene. Typical dicarboxylic acids include isophthalic acid, terephthalic acid, 4,4'bibenzoic acid, bis(4-carboxyphenyl)ether, bis(4-carboxyphenyl)sulfide, bis(4-carboxyphenyl)sulfone, bis(4-carboxyphenyl)methane, 1,2-bis(4-carboxyphenyl)ethane, 1,2-bis(4-carboxyphenoxy)ethane, hexahydroterephthalic acid, 5-t-butylisophthalic acid, 5-chloroisophathalic acid, and the various naphthalene dicarboxylic acids such as 2,5-naphthalene dicarboxylic acid.

Suitable polycarbonates are the polycarbonates of diphenols exemplified by the diphenols set forth above.

Suitable polyamides are condensation products obtained by reaction of $C_6$ to $C_{12}$ aliphatic diacids and $C_6$ to $C_{12}$ aliphatic primary diamines such as polyhexamethylene adipamide (nylon 6,6), polyhexamethylene sebacamide (nylon 6,10) and polyhexamethylene dodecamide (nylon 6,12), or by the polymerization of lactams such as $\epsilon$-caprolactam (nylon 6), $\alpha$pyrrolidone, piperidone, valerolactam, lauryllactam, etc.

The condensation polymer is of sufficient molecular weight to provide adequate mechanical properties to articles molded from the resin composition of the present invention and preferably possesses a number average molecular weight of at least about 10,000.

The halogenated flame retardant additive is selected from among the many such additives available to the practitioner of the art. Such additives include halogenated diphenylethers containing from 6 to 10 chlorine or bromine atoms per molecule such as decabromodiphenylether; halogenated aliphatic hydrocarbons such as the chlorinated parafins and hexabromocyclododecane; halogenated aromatic hydrocarbons such as hexabromobenzene and halogenated diphenyls containing from 6 to 10 chlorine or bromine atoms per molecule such as decabromodiphenol; and halogenated diphenyl carbonates containing from 6 to 10 chloride or bromine atoms per molecule such as 2,4,6-tribromodiphenyl carbonate and decabromodiphenyl carbonate. The halogenated flame retardant additive is added to the condensation polymer in sufficient amount to enhance flame retardance. Generally, from about 3 to about 15 weight percent based on the weight of the total resin composition is added.

In order to maximize the effect of the halogenated flame retardant additive, a flame retardant synergist, selected from the many such additives available to the practitioner of the art, is added to the composition. Such synergists include zinc oxide, zinc borate, ferrous and ferric oxides, alumina, antimony oxide and the like and are used in effective amounts generally in the range of about 0.5 to about 5 weight percent based on the weight of the total resin composition. Antimony oxide is a preferred synergist. The flame retardant synergist is of fine particle size such that the weight average particle size is less than about 2 microns and preferably less than about 0.1 micron. Such fine particle sizes are readily obtained by milling or grinding techniques well known to those skilled in the art. Nyacol Inc., Ashland, Mass. is a convenient source of colloidal antimony oxide sold as water dispersions and pastes, the particle size of the antimony oxide being approximately 15 millimicrons.

Although the flame retardant synergist greatly increases the degree of hydrolytic degradation of the condensation polymers of the present invention when the polymers are melt blended with halogenated flame retardant and synergist, isolation of the flame retardant synergist from the flame retardant has now been found to reduce the degradation process very effectively. Such isolation has been achieved by encapsulating or embedding the synergist particle in rubber particles or covering the surface of the synergist particles with a rubber film or layer so that the synergist particles are substantially covered or occluded with the non-blocking rubber. The term non-blocking rubber is used to connote a composition comprising a three-dimensional network structure with a glass transition temperature below room temperature, particles of which have little tendency to flow together and coalesce into large non-dispersible lumps at normal processing temperatures because of the presence of a sufficient density of crosslinks or because the presence of blocks or grafts or copolyblends which have a glass transition temperature sufficiently above the drying temperature to which the coagulated latex may be subjected during the recovery of the occluded synergist. Preferred non-blocking rubber compositions include homo- and copolymers of monomers such as butadiene, isoprene and isobutylene and polyblends and graft and block copolymers thereof of the type which are conventionally used in the rubber reinforcement of thermoplastic resins. Thus, homo- and copolymers of butadiene of a crosslink density which would not make them non-blocking may be rendered non-blocking by graft or block polymerization of monomers such as styrene, acrylonitrile or methyl methacrylate. Such graft or block copolymers provide an advantage in that they aid ready dispersion of the occluded synergist in the condensation product. The non-blocking rubber is preferably prepared by conventional methods such as by emulsion polymerization, suspension polymerization or mass polymerization. It can be obtained as an aqueous latex of particle size in the range of about 0.05 to 2.0 microns, and more preferably of particle size in the range of 0.1 to about 0.7 micron. It may also be obtained by a mass or mass-suspension process in a particle size range of about 1 to 10 microns and more preferably in the range of about 2 to 3 microns.

In one method of coating the particulate flame retardant synergist with non-blocking rubber, the synergist in powder form is wetted with water and dispersed in a latex of non-blocking rubber and the latex is coagulated by any suitable means such as by freezing, by salt addition or by pH adjustment. Alternatively, an anionic or cationic aqueous colloidal dispersion of the flame retardant synergist is mixed with a similarly charged latex of non-blocking rubber and the latex is agglomerated or coagulated by any suitable means such as by freezing, by salt addition or by adjustment of the pH. In another method a stream of anionic aqueous colloidal dispersion of flame retardant synergist is mixed with a stream of cationic latex of non-blocking rubber to give a coagulum comprising flame retardant synergist particles coated with latex particles. In yet another method, a stream of cationic aqueous colloidal dispersion is mixed with a stream of anionic latex of non-blocking rubber. In a further alternative, a rubber monomer is added to an aqueous colloidal dispersion of flame retardant synergist and is polymerized by conventional free radical methods to form a coating of polymer on the particles of flame retardant synergist. The coating is then rendered non-blocking by graft polymerization of a suitable monomer such as styrene, acrylonitrile, or methyl methacrylate and the coated particles are agglomerated or coagulated by any suitable means such as by freezing, by salt coagulation or by adjustment of the pH. In still another alternative, the antimony oxide is suspended in a suspension or mass system comprising a rubber polymer and a monomer system containing one or more monomers selected from the group consisting of styrene, α-methyl styrene, and methyl methacrylate and optionally containing acrylonitrile or methacrylonitrile and the system is subjected to suspension or mass polymerization.

The affinity of the flame retardant synergist for the occluding rubber in a mass or suspension polymerization system can be increased by treatment of the synergist with a coupling agent prior to its introduction to the polymerization system. The coupling agent is preferably an organosilane coupling agent containing an oleophilic group. Examples of such coupling agents include alkyl- and cycloalkyl-alkoxysilanes such as hexyltrimethoxysilane, octyltrimethoxysilane, dodecyltrimethoxysilane, octadecyltrimethoxysilane, dioctyldimethoxysilane, dioctyldiethoxysilane, cyclohexyltrimethoxysilane, and the like and epoxyalkyl- and epoxycycloalkyl-alkoxysilanes such as 9,10-epoxyoctadecyltrimethoxysilane and 3,4-epoxycyclohexyl-trimethoxysilane and the like. The amount of coupling agent used is sufficient to impart an oleophilic character to the flame retardant synergist and is generally in the range of about 0.1 to about 4 parts per 100 parts of synergist. The coupling agent is applied to the synergist by any of the conventional methods for such application such as by spray or by solution application.

The agglomerate or coagulum formed by the various methods of coating or encapsulating the flame retardant synergist comprises particles of synergist substantially coated with or occluded by non-blocking rubber. The agglomerate or coagulum is separated from the supernatant aqueous phase and is dried or vacuum dried at a temperature below the blocking temperature of the rubber. It is then blended and dispersed by any suitable means such as melt blending with the condensation polymer and the halogenated flame retardant. The ratio of non-blocking rubber latex to flame retardant synergist is selected so that there is at least sufficient non-blocking rubber to substantially cover the synergist. While the rubber serves to isolate the synergist from the halogenated flame retardant, it also improves the toughness and tensile elongation of articles molded from the resin composition. The rubber fraction of the non-blocking rubber is preferably present in the range of about 2 to about 15 weight percent based on the weight of the total resin composition. Electron microscopy reveals that the bulk of the flame retardant synergist remains occluded by or embedded in the rubber phase and thus has little opportunity to interact with the halogenated flame retardant which is preferentially dispersed or dissolved in the condensation polymer, until the polymer is exposed to flaming conditions.

The thermoplastic vinyl addition polymers which may be conveniently added to the rubber occluded flame retardant synergist as an anti-blocking agent, diluent or dispersion aid may be any polymer with a glass transition temperature above room temperature such as polymers of styrene, α-methylstyrnee, acrylonitrile, methacrylonitrile, vinyl acetate, methyl acrylate and methyl and ethyl methacrylate. Because of their relatively high glass transition temperature, homo- and copolymers of styrene, α-methylstyrene and methyl methacrylate and copolymers of acrylonitrile are preferred. The thermoplastic vinyl addition polymer can be added in suspension or latex form to the dispersion of flame retardant synergist in the rubber suspension or latex prior to agglomeration or coagulation. Melt blending of this agglomerate or coagulum with the condensation polymer leads to a fine dispersion in the condensation polymer of the vinyl addition polymer containing the rubber occluded flame retardant synergist. The vinyl addition polymer can act also as a processing aid since it can reduce the melt viscosity of the molding resin and can be used advantageously for this purpose to provide a total including grafted vinyl addition polymer of up to about 40 weight percent based on the weight of the total resin composition. Excessive amounts may, however, interfere with the desired rubber coating of the flame retardant synergist and/or with the agglomeration process. It is therefore, preferred to limit the amount of vinyl addition polymer including grafted vinyl addition polymer at the agglomeration step to no more than twice the weight of rubber component. If a larger amount of vinyl addition polymer is desired as a processing aid, it can be introduced separately in any convenient form for such addition, for example, as solid pellets and dispersed by melt blending.

In addition to the above described components, the resin compositions of the present invention can include additives such as colorants, plasticizers, stabilizers, hardeners, lubricants, reinforcing agents and the like.

Blending of the components of the resin composition of the present invention is carried out in any convenient way, such as by dry mixing pellets or powder of the condensation polymer with the flame retardant and rubber-occluded synergist or by adding flame retardant and rubber-occluded synergist to molten condensation polymer. The various components and any other additives are preferably as free as possible of water. Mixing is preferably carried out in as short a time as needed to provide a sufficiently intimate and uniform blend. Melt blending is effected at a temperature selected for adequate melt viscosity but insufficient to cause thermal degradation of the resin. The molten blend can be extruded and cut up into molding compounds such as granules, pellets, etc. by conventional techniques.

The resin compositions can be used as molding resins and can be molded in any equipment conveniently used for thermoplastic compositions at temperatures suitable for the particular molding resin composition, e.g., an Arburg machine with temperature in the range of about 250° to about 350° C. and mold temperature about 100° to 150° C. can be used. Depending on the molding properties of the condensation polymer, the amount of the other components and the melt viscosity of the molding resin, those skilled in the art will be able to make the conventional adjustments in molding cycles to accommodate the composition.

The invention is further illustrated but is not intended to be limited by the following examples in which parts and percentages are by weight unless specified otherwise.

EXAMPLE 1

This Example shows the preparation of rubber-occluded flame retardant synergist from a finely divided powder of antimony oxide.

A finely divided antimony oxide of weight average particle size 1.6 microns was wetted with water and added to an anionic latex containing 40 weight percent of a polybutadiene latex grafted with 20 parts of an interpolymer containing 70 percent styrene and 30 percent acrylonitrile per 100 parts of polybutadiene. The latex was stirred to provide a uniform dispersion and to facilitate adsorption of the rubber on the antimony oxide. An anionic latex containing 40 weight percent of an α-methylstyrene acrylonitrile interpolymer (αMS:AN=70:30) was added to the latex dispersion to provide a weight ratio of 1 part polybutadiene to 10 parts of styrenic interpolymer (PSAN+PαMSAN) and the blend was stirred until the dispersion was again uniform. A small amount of latex containing Polygard, a rubber stabilizer and Ionol antioxidant to provide 2 parts Polygard and 1 part Ionol per 100 parts polybutadiene was added and the mixed latices were coagulated by adding the blend to a 4 percent aqueous solution of magnesium sulfate at 92° C. The fine coagulum was separated, washed with water to remove the salts and dried in vacuo. It was then blended with an amount of α-methylstyrene acrylonitrile interpolymer to give a ratio of styrenic interpolymer to "ungrafted" polybutadiene to antimony oxide of 22:8:1.

EXAMPLE 2

Example 1 was repeated to provide a rubber-occluded flame retardant synergist comprising styrene acrylonitrile interpolymer, ungrafted polybutadiene and antimony oxide in the weight ratio of 22:8:2.

EXAMPLE 3

This Example describes the preparation of rubber-occluded flame retardant synergist from a colloidal dispersion of synergist.

An aqueous colloidal dispersion of antimony oxide sold by Nyacol, Inc., Ashland, Mass. under the trade name Nyacol A-1530, containing 30 weight percent antimony oxide was added to an aqueous anionic latex containing 40 weight percent of polybutadiene grafted with 20 parts of an interpolymer containing 70 percent styrene and 30 percent acrylonitrile per 100 parts of polybutadiene and was stirred to provide a uniform blend. The procedure of Example 1 was then carried out to obtain a blend of rubber-occluded antimony oxide in an interpolymer of α-methylstyrene and acrylonitrile. The ratio of styrenic interpolymer to "ungrafted" polybutadiene to colloidal antimony was 22:8:1.

EXAMPLE 4

This Example sets forth the preparation of a resin composition comprising an aromatic polyester, a flame retardant and the rubber-occluded antimony oxide of Example 1.

Finely divided decabromodiphenyl ether, DBDPE (5 parts by weight) was dry blended with 30 parts by weight of the rubber-occluded antimony oxide of Example 1 and 70 parts by weight of pellets of an aromatic polyester of inherent viscosity 0.72 which was the condensation product of 2,2-bis(4-acetoxyphenyl)propane and an equimolar mixture of isophathalic and terephthalic acids. The dry blend was further melt blended in a Brabender Plastigraph at 270° C. extruded and pelletized to provide a molding resin composition. Inherent viscosity of the polyester was determined at 25° C. on a solution containing 0.5 g. polyester per deciliter of solution. The solvent was a 60:40 blend of phenol and sym-tetrachloroethane.

The resin composition was molded in an Arburg machine at 300° C. to provide molded test samples. Measurement of physical properties was carried out in accordance with the following methods: tensile strength ASTM D 638; Izod impact strength ASTM D 256; flame retardance UL-94 ratings of Sept. 17, 1973. [Note: the UL-94 ratings are not intended to reflect hazards which may be presented by test materials under actual fire conditions.] Melt viscosity was determined on a Sieglaff-McKelvey capillary rheometer at 316° C. and a shear rate of 100 sec.$^{-1}$. The data are presented in Table 1.

EXAMPLES 5–6

Resin compositions were prepared as in Example 4 with the rubber-occluded antimony oxides of Examples 2 and 3, respectively. Data for physical properties are presented in Table 1.

EXAMPLES 7–10

For comparative purposes, resin compositions comprising a polyblend of 70 parts by weight of the polyisophthalate-terephthalate of Example 4, 30 parts by weight of a blend of the styrene acrylonitrile interpolymer and styrene-acrylonitrile-polybutadiene graft of Example 1 containing 22 parts by weight of styrene-acrylonitrile interpolymer and 8 parts of polybutadiene was prepared by the melt blending method of Example 4. The polyblend was further blended with flame retardants and synergists as follows:

Example 7—100 parts by weight polyblend, 5 parts by weight DBDPE.

Example 8—100 parts by weight polyblend, 10 parts by weight DBDPE.

Example 9—100 parts by weight polyblend, 5 parts by weight DBDPE, 1 part by weight of finely divided antimony oxide of weight average particle size 1.6 microns.

Example 10—100 parts by weight polyblend, 5 parts by weight DBDPE, 2 parts by weight of finely divided antimony oxide of weight average particle size 1.6 microns.

Data for physical properties are presented in Table 1.

TABLE 1

EVALUATION OF RESIN COMPOSITIONS COMPRISING AROMATIC POLYESTERS

| Parts per 70 parts Polyester | | | Izod Impact Strength joules/cm | Tensile MPa | Elongation % | UL-94 Flammability Test - Sample thickness 3.2 mm |
|---|---|---|---|---|---|---|
| Molding Resin | DBDPE | Antimony Oxide | | | | |
| Example 4 | 5 | 1 | 1.4 | 59 | 25 | V-0 |
| 5 | 5 | 2 | 1.1 | 59 | 15 | V-0 |
| 6 | 5 | 2 | 2.3 | 59 | 59 | V-0 |
| 7 | 5 | — | 2.5 | 59 | 56 | Fail |
| 8 | 10 | — | 2.0 | — | — | V-1 |
| 9 | 5 | 1 | 0.9 | — | — | V-1 |
| 10 | 5 | 2 | 1.0 | — | — | V-0 |
| 11 | — | — | 2.9 | 59 | 65 | Fail |

DBDPE = decabromodiphenyl ether.

The data of Table 1 show that the introduction of decabromodiphenyl ether does little to improve flame retardance of the polyester composition (Example 11 vs. Example 7) and that the composition with antimony oxide to improve the flame retardance of the polyester causes a severe decline in impact strength (Example 11 vs. Examples 9, 10). When the flame retardant synergist is occluded with polybutadiene graft, the damage to impact strength is lessened while the improved flame retardance is maintained (Examples 4, 5 vs. Examples 9, 10), and this damage is further decreased when rubber-occluded colloidal antimony oxide is used (Example 6 vs. Examples 4, 9). A further advantage of the rubber-occluded colloidal antimony oxide is shown by the relative stability of the melt viscosity of the resin composition on prolonged heating in a capillary rheometer at 280° C. Greater preservation of melt viscosity on heating is indicative of reduced molecular weight degradation of the polyester component. The rate of melt viscosity change with time at constant shear stress is shown in Table 2.

TABLE 2

RATE OF DEGRADATION ON PROLONGED HEATING IN A RHEOMETER

| | Melt viscosity at 280° C. kilopoise at 200 sec—$^1$ | |
|---|---|---|
| Example | 5 Minutes | 14 Minutes |
| 11 | 32 | 23 |
| 9 | 17 | 3.6 |
| 6 | 26 | 17 |

Reduced molecular weight degradation is further illustrated by the data set forth in Table 3 for the inherent viscosity of the polyester recovered from molded samples of the polyester blends of Examples 4, 6, 11 and 12 containing flame reretardant and flame retardant synergist. Example 12 comprises polyester, DBDPE and antimony oxide in the weight ratio of 100:7:2 without rubber additive.

TABLE 3

EFFECT OF FLAME RETARDANT ADDITIVES ON INHERENT VISCOSITY OF POLYESTER DURING THE MOLDING CYCLE

| Example | Parts per 70 parts Polyester | | | Inherent Viscosity of Recovered Polyester |
|---|---|---|---|---|
| | Rubber | DBDPE | Antimony Oxide | |
| 4 | 8 | 5 | 1 | 0.56 |
| 6 | 8 | 5 | 1 (Colloidal) | 0.63 |
| 11 | 8 | None | None | 0.62 |
| 12 | None | 5 | 1.4 | 0.42 |

The data show that the degree of degradation of molecular weight of polyester and polyeester containing occluded colloidal antimony oxide is almost identical while a somewhat greater degree of degradation occurs with occluded particulate antimony oxide and a significantly greater degree occurs with polyester containing flame retardant and synergist unprotected by rubber.

EXAMPLE 13

A polycarbonate of 2,2-bis(4-hydroxyphenyl)propane is melt blended with decabromodiphenyl ether and the rubber-occluded antimony oxide of Example 3 by the method and in the proportions of Example 4. Improved flame retardance is obtained in comparison with the polycarbonate without flame retardant and synergist. Improved impact resistance and polymer stability is obtained in comparison with a composition comprising the same proportions of polycarbonate, DBDPE, antimony oxide, polybutadiene graft and copolymer of styrene and acrylonitrile, which is prepared by simple blending of the components without the step of occlusion of antimony oxide in the polybutadiene graft.

EXAMPLE 14

A nylon 6,6 is melt blended with decabromodiphenyl ether and the rubber-occluded antimony oxide of Example 3 by the method and in the proportions of Example 4. Improved flame retardance is obtained in comparison with the nylon 6,6 without flame retardant and synergist. Improved impact resistance and polymer stability is obtained in comparison with a composition comprising the same proportions of nylon 6,6, DBDPE, antimony oxide, polybutadiene graft and copolymer of styrene and acrylonitrile which is prepared by simple blending of the components without the step of occlusion of antimony oxide in the polybutadiene graft.

What is claimed is:

1. A resin composition comprising
  A. a thermoplastic polyester;
  B. an effective amount of a halogenated flame retardant additive; and
  C. an effective amount of a flame retardant synergist of average particle size less than about 2 microns, wherein the particles of the synergist are substantially occluded with a non-blocking rubber.

2. A resin composition comprising
  A. a thermoplastic polyester;
  B. about 3 to about 15 weight percent of a halogenated flame retardant additive;
  C. about 0.5 to about 5 weight percent of a flame retardant synergist of average particle size less than about 2 microns;
  D. about 2 to about 15 weight percent of a non-blocking rubber substantially occluding the particles of flame retardant synergist; and
  E. about 0 to about 40 weight percent of a thermoplastic vinyl addition polymer;

wherein the weight percentages are based on the weight of the resin composition.

3. The resin composition of claim 2 wherein the flame retardant synergist is selected from the group consisting of zinc oxide, zinc borate, ferrous and ferric oxides, alumina, and antimony oxide.

4. The resin composition of claim 3 wherein the flame retardant synergist is of particle size less than about 0.1 micron.

5. The resin composition of claim 4 wherein the flame retardant synergist is antimony oxide.

6. The resin composition of claim 2 wherein the non-blocking rubber is selected from the group consisting of homo- and copolymers of butadiene, isoprene, and isobutylene.

7. The resin composition of claim 2 wherein the thermoplastic vinyl addition polymer is selected from the group consisting of polymers of styrene, α-methylstyrene, acrylonitrile and methyl methacrylate.

8. A resin composition comprising:
  A. a thermoplastic polyester;
  B. about 3 to about 15 weight percent of a halogenated flame retardant additive;
  C. about 0.5 to about 5 weight percent of an antimony oxide of particle size less than about 0.1 micron;
  D. about 2 to about 15 weight percent of non-blocking butadiene rubber substantially occluding the particles of antimony oxide; and
  E. about 0 to 40 weight percent of a thermoplastic vinyl addition polymer selected from the group consisting of polymers of styrene, α-methylstyrene, acrylonitrile and methyl methacrylate;

wherein the weight percentages are based on the weight of the resin composition.

9. An article molded from the resin composition of claim 1.

10. An article molded from the resin composition of claim 2.

11. An article molded from the resin composition of claim 6.

12. An article molded from the resin composition of claim 8.

13. A process for preparation of a resin composition comprising a thermoplastic polyester, an effective amount of a flame retardant and an effective amount of a flame retardant synergist wherein the process comprises:
  A. dispersing the flame retardant synergist of average particle size less than about 2 microns in a latex of a non-blocking rubber of average particle size in the range of about 0.05 to about 2.0 microns;
  B. coagulating the latex to form a coagulum wherein the rubber particles substantially occlude the particles of flame retardant synergist; and
  C. recovering and dispersing the coagulum in the thermoplastic polyester containing the flame retardant.

14. The process of claim 13 wherein the flame retardant synergist is selected from the group consisting of zinc oxide, zinc borate, ferrous and ferric oxides, alumina, and antimony oxide.

15. The process of claim 14 wherein the non-blocking rubber is selected from the group consisting of homo- and copolymers of butadiene, isoprene, and isobutylene.

16. The process of claim 15 wherein the average particle size of the latex of non-blocking rubber is in the range of about 0.1 to about 0.7 micron.

17. The process of claim 16 wherein the flame retardant synergist is added to the latex of non-blocking rubber as an aqueous colloidal dispersion.

* * * * *